United States Patent

Michels et al.

Patent Number: 5,417,909
Date of Patent: May 23, 1995

[54] PROCESS FOR MANUFACTURING MOLDED ARTICLES OF CELLULOSE

[75] Inventors: Christoph Michels; Reinhard Maron; Klaus Berghof, all of Rudolstadt, Germany

[73] Assignee: Thüringisches Institut für Textil- und Kunststoff-Forschung E.V., Schwarza, Germany

[21] Appl. No.: 198,514

[22] Filed: Feb. 18, 1994

Related U.S. Application Data

[63] Continuation-in-part of Ser. No. 76,907, Jun. 15, 1993, abandoned.

Foreign Application Priority Data

Jun. 16, 1992 [DE] Germany .......... 42 19 658.2
May 17, 1993 [DE] Germany .......... 43 08 524.5

[51] Int. Cl.$^6$ .......... B29C 47/00; D01D 5/12; D01F 2/00
[52] U.S. Cl. .......... 264/177.13; 264/203; 264/210.3; 264/210.8; 264/211.16
[58] Field of Search .......... 264/177.13, 187, 203, 264/208, 210.1, 210.3, 210.8, 211.16; 106/163.1, 186, 203

[56] References Cited

U.S. PATENT DOCUMENTS

| | | | |
|---|---|---|---|
| 3,579,625 | 5/1971 | Jacquinet | 264/177.13 |
| 4,246,221 | 1/1981 | McCorsley, III | 264/203 |
| 5,252,284 | 10/1993 | Jurkovic et al. | 264/187 |

Primary Examiner—Leo B. Tentoni
Attorney, Agent, or Firm—Howard M. Ellis

[57] ABSTRACT

A process for manufacturing molded articles of cellulose, such as fibers and films, which includes (a) providing an aqueous solution comprising cellulose in a tertiary amine N-oxide, (b) extruding jets of the aqueous solution through an extrusion die into a non-precipitating medium for cellulose, the extrusion die having nozzle passages the length L of which is in the range from 200 to 800 μm and the capillary section of which has a length l in the range from 50 to 240 μm and a ratio l/d of length l to its diameter d in the range from 0.5 to 2.0, the molecules of cellulose in the jets of solution being pre-orientated by the extrusion die through a shear force gradient in the nozzle passages, (c) additionally orientating the cellulose molecules by stretching the extruded jets of solution in said non-precipitating medium with a spinning stretch ratio V of linear velocity of the precipitated molded article to the linear velocity of the solution leaving the die in the range $0.5 > V > 3$, and (d) precipitating the molded cellulose articles from said jets of solution by contacting with a precipitating medium without stretching. The shortened shearing section of the nozzle passages allows a reduction of the spinning pressure. The safety of the spinning operation is increased by the low spinning stretch. The stretch interval in the non-precipitating medium is reduced, and the elongation and loop strength data of the spun fibers are improved.

20 Claims, 1 Drawing Sheet

PROCESS FOR MANUFACTURING MOLDED ARTICLES OF CELLULOSE

CROSS REFERENCES TO RELATED APPLICATION

This application is a continuation-in-part of application U.S. Ser. No. 076,907, filed Jun. 15, 1993.

FIELD OF THE INVENTION

The invention is related to a process for manufacturing molded cellulosic articles, such as fibers, films etc., from a solution of cellulose in a tertiary amine N-oxide, particularly N-methylmorpholine-N-oxide, containing water, comprising extruding the solution through an extrusion die into a medium not precipitating the cellulose, orientating the cellulose molecules by stretching the extruded solution jet in this medium, and precipitating the cellulose from the solution jet by contacting it with a precipitating medium without substantial stretching.

BACKGROUND OF THE INVENTION

From U.S. Pat. No. 4,246,221 the dry wet spinning of solutions of cellulose in N-methylmorpholine-N-oxide/-water mixtures is known. With this process the stretch ratio in the non-precipitating medium between the spinneret and the coagulation bath is to be at least 3 (col. 3, lines 46–47. The numerical values for the stretch ratio given in the examples are in the range from 2.6 to 798. The thickness of the layer of the non-precipitating medium between the spinneret and the coagulation bath is quoted 50 and 305 mm, respectively, and the diameters of the spinneret holes are 250 $\mu$m and 305 $\mu$m, respectively, and the diameters of the spinneret holes are 250 $\mu$m and 1000 $\mu$m, respectively. From Table VI can be gathered that spinning with a low spin-stretch ratio does not yield satisfactory fiber properties. With a stretch ratio of 2.6 the wet modulus at 5% is only 3.1 whereas a value of at least about 7 would be satisfactory. This, U.S. Pat. No. 4,246,221 teaches to use high spin-stretch ratios to achieve good fiber properties.

U.S. Pat. No. 5,252,284 teaches to improve the fiber or filament characteristics with the process mentioned here-above by extruding a solution of cellulose through a nozzle orifice having a length of at least 1000 $\mu$m and a minimum diameter along said length of at most 150 $\mu$m. A cylindrical section having this minimum diameter is formed at the outlet end of said nozzle orifice and has a minimum length of $\frac{1}{4} \times 1000$ $\mu$m = 250 $\mu$m. In example 6 this length is 430 $\mu$m with its diameter being 50 $\mu$m. According to col 3, lines 1 to 4, the orifice passage must be so elongated and of such small diameter that the generated shear forces acting on the solution flowing through the passage result in a significant preorientation of the cellulosic polymer. As the spinning pressure of the solution to be maintained upstream of the nozzle is proportional to the length of the passage section having said small diameter, the process requires high spinning pressures in the order of 100 to 1200 bar. These high spinning pressures are a considerable drawback for a spinning process on a commercial scale.

It is known that the surface structure of a fiber is to a high degree responsible for the textile properties of the products fabricated from the fiber. E.g. the gloss and the feel of a textile article are strongly affected by the morphologic structure of the fiber surface. Viscose rayon has a multiple lobate surface structure, the constrictions at the fiber surface extending in the longitudinal direction of the fiber. This surface structure of the viscose fiber results in satisfactory textile properties such as e.g. sufficient fiber adhesion with their spinning to fiber yarns, a satisfactory thread connection with filament yarns and a sufficient non-slip property of flat-shaped articles made from these yarns.

Jacquinet in U.S. Pat. No. 3,579,625 discloses a process for forming trilobal filaments consisting of cellulose esters. This pure dry spinning is a completely other process than the dry wet spinning and affects the filament profiling in a different manner. The aim of such profiling is to impart high resilience to these filaments.

SUMMARY OF THE INVENTION

The present invention is based on the aim to provide a process for manufacturing molded cellulose articles, particularly fibers and films, from a solution of cellulose in a tertiary amine-N-oxide containing a non-solvent for cellulose (e.g. water) according to the dry wet extrusion process in which the desired strength properties of the molded articles are achieved only partially by the spin-stretching in the layer of non-precipitating medium between the die orifice and the precipitating bath and furthermore by means of an additional control factor during the spinning operation.

A further object of the present invention is to reduce the spinning stretch with the aim to increase the safety of the spinning operation.

Another object of the invention is to achieve a sufficient orientation of cellulose chains in the molded articles to obtain satisfactory mechanical properties of said articles by (a) pre-orientating the cellulose chains of the solution in the nozzle passage by shear forces under reduced spinning pressures and (b) final orientating the cellulose chains by reduced spin-stretching of the extruded solution jet in a layer of the non-precipitating medium.

Still another object of the invention is to reduce the capital and operating costs for the spinning, mainly the capital costs for spinning pumps and spinnerets.

Yet another object of the invention is to spin cellulose fibers and filaments from aqueous aminoxide solution which have improved adhesion, sufficient thread connection and satisfactory non-slip properties.

Still yet another object of the invention is to manufacture molded articles, such as fibers, filaments and films, with improved strength properties, especially improved elongation and loop strength.

Further advantages of the process of the invention can be gathered from the following specification.

These and other objects of the invention are reached by a process for manufacturing molded articles of cellulose which comprises the steps of (a) providing an aqueous solution comprising cellulose in a tertiary amine N-oxide;
(b) extruding jets of said aqueous solution through an extrusion die into a non-precipitating medium for cellulose, said extrusion die having nozzle passages the length L of which is in the range from 200 to 800 $\mu$m and the capillary section of which has a length l in the range from 50 to 240 $\mu$m and a ratio l/d of the length to its diameter d in the range from 0.5 to 2, said molecules of cellulose in said jets of solution being pre-orientated by said extrusion die through a shear force gradient in said nozzle passages;

(c) additionally orientating the cellulosic chains by stretching the extruded jets of solution in said non-precipitating medium with a spinning stretch ratio V of linear velocity of the precipitated molded article to the linear velocity of the solution leaving the die in the range $0.5 < V < 3$; and (d) precipitating the molded cellulose article from said jets of solution by contacting with a precipitating medium without stretching.

As a further embodiment of the invention molded articles of cellulose may be manufactured by the steps of (a) providing an aqueous solution comprising cellulose in tertiary amine N-oxide;

(b) extruding jets of the aqueous solution through an extrusion die into a non-precipitating medium of cellulose, the extrusion die having nozzle passages the length L of which is in a range from 350 to 650 μm and the capillary section of which has a width d in the range from 50 to 300 μm and a ratio l/d of its length to its width d in a range from 0.5 to 2, molecules of the cellulose in the jets of solution being preoriented by the extrusion die through a shear force gradient in the nozzle passages;

(c) orienting further the cellulose molecules by stretching the extruded jets of solution in the non-precipitating medium with a spinning stretch ratio V of linear velocity of the precipitated molded film to the linear velocity of the solution leaving the die being in a range $1 < V < 3$, and (d) precipitating the molded cellulose films from the jets of solution by contacting with a precipitating medium without stretching.

With the process of the invention on the one hand high spinning stretch ratios and the drawbacks accompanied therewith such as break of thread are avoided, and on the other hand expenditures caused by high spinning pressures due to elongated nozzle passages of small diameter are reduced. We have found that no elongated passage is necessary to achieve a sufficient preorientation of cellulose molecules in the solution jet exiting the passage, but that a shearing-effective passage length of at most 240 μm and generally of 50 to 120 μm is sufficient for the pre-orientation.

A pre-orientation of the cellulose molecules is achieved by the shear gradient existing in the shortened extrusion die passage according to the invention so that the strength data of the fibers produced according to the known processes are achieved and partially surpassed with a comparatively small final spin-stretching. It was found that the orientation of the cellulose molecules provided in the short extrusion die passages does not relax again in the subsequent zone of non-precipitating medium when the solution jet has left the passage, but is maintained and is at least partially added to the orientation generated by the spin-stretching in said zone. As a result (a) at least partially improved strength data of the produced molded articles are achieved, (b) the susceptibility to troubles (break of thread) is decreased and the spinning operation is facilitated by the reduced spinning stretch, and (c) apparatus and operational expenditures are reduced because operation requires lower spinning pressures. Generally, the stretching is carried out at a ratio in the range $0.5 < V < 3$, preferably in the range $1.0 < V < 3$. In the most cases the stretch lies in the range $1.4 < V < 3$.

Stretch values $V < 1$ can occur when a fiber having a higher denier (wool type; 0.36 to 0.42 tex) is spun through spinneret bores having diameters between 50 and 70 μm. Then a higher ejection rate will result with unchanged cellulose concentration and final draw-off velocity due to the necessarily larger quantity of solution which is to be supplied through the spinneret per unit of time, said higher ejection rate resulting in $V < 1$, i.e. in a jet compression. There are analogous relationships when the ejection rate is increased because more solution per time unit must be supplied through the spinneret due to a lower cellulose concentration (e.g. with a higher DP).

With a preferred embodiment of the process for fiber production according to the invention the pre-orientation is generated in the spin jet emerging from the extrusion die by a shear gradient in the die channel of $\dot{\gamma} > 3 \times 10^4 \, s^{-1}$. With this the shear gradient is given by the formula $$\dot{\gamma} = \frac{4 \cdot \dot{V}}{\pi \cdot R^3}$$

wherein $\dot{V}$ means the Volume velocity through the cross section of the extrusion die bore and R means the radius of the circular cross section of the extrusion die bore. The numerical value for the shear gradient is valid for a final draw-off velocity of 50 m/min. With smaller final draw-off velocities the minimum limiting value for $\dot{\gamma}$ can be correspondingly smaller than $3 \times 10^4 \, s^{-1}$, but not smaller than $3 \times 10^3 \, s^{-1}$. The lower value is valid for the following limiting conditions: 70 μm diameter of the spinneret bore; 8 m/min final draw-off velocity; $V = 3$; 10.5 weight percent cellulose in the solution.

With another preferred embodiment of the process for the manufacture of films according to the invention the pre-orientation is generated by a shear gradient in the slot die channel of $\dot{\gamma} > 1.3 \times 10^4 \, s^{-1}$. This limiting value is based on the relation of the formula $$\dot{\gamma} = \frac{6 \cdot \dot{V}}{B \cdot H^2},$$

in which $\dot{V}$ has the above-mentioned meaning and B means the length of the slot and H means the width of the slot. The limiting value is likewise valid for the final draw-off velocity of 50 m/min. With smaller final draw-off velocities the limiting value for $\dot{\gamma}$ is likewise decreased, but not below $\dot{\gamma} = 1.3 \times 10^3 \, s^{-1}$. The smaller value is valid for the following limiting conditions: 200 μm width of the slot; 10 m/min final draw-off velocity; $V = 3$; 10.5 weight percent cellulose in the solution.

According to the preferred embodiment of the process of the invention the solution jets are extruded through an extrusion die with passages, the capillary exit section of which has a ratio l/d in the range from 0.8 to 1.5. For producing fibers with this passage ratio the nozzle passages have a length of capillary section in the range from 50 to 120 μm. In a more preferred embodiment the capillary section of the passages has a ratio l/d of 1 and a length of 50 to 70 μm.

According to another preferred embodiment of the invention for the filament production the solution jets are extruded through an extrusion die having passages the capillary section of which has a ratio l/d of about 2 and a length of 100 to 120 μm. Whereas according to the invention the whole length L of the nozzle passages comprising the prechannel section of enlarged diameter and the capillary section of small diameter, is in the range from 200 to 800 μm, it is preferred that the total length L of the nozzle passages is in the range from 400 to 600 μm. In the most preferable case the passages have a total length L of 500 μm.

According to the preferred embodiment of the process of the invention the jets of solution are extruded into a layer of non-precipitating medium having a thickness in the range from 2 to 48 mm, preferably from 2 to 20 mm. The spin-stretch ratio which is reduced in comparison to the prior art allows to curtail the stretch interval and consequently to design a more compact spinning apparatus.

Preferably the contact of the solution jet takes place in a spinning funnel in concurrent with the precipitating medium. In this connection the axis of the spinning funnel is substantially arranged vertically, and the flow of the precipitating medium is directed from above to below. The flow of the precipitating medium through the spinning funnel is generally induced by the free fall. Then the stretch is achieved in that the precipitating strand of fibers is substantially accelerated to their draw-off velocity by the precipitating medium flowing through the spinning funnel. Less than 30% of the spinning bath velocity is transferred to strand of fibers with the percentage being dependent on the number of the capillary channels, filament denier and the exit cross section of the spinning funnel. In this connection the length x of the spinning funnel is to be dimensioned so that taking into account the supernatant Δx of the spinning bath above the top edge of the spinning funnel according to the formula $v = \sqrt{2\ g(x+\Delta x)}$ for the final velocity of the precipitating medium, the supply velocity of the strand of fibers at the deflector element situated below the spinning funnel is substantially equal to its draw-off velocity so that the friction goes toward zero and consequently an uncontrolled stretch of the precipiated cellulose thread is avoided. The after-stretching of the precipitated thread would impair its textile physical parameters, particularly its elongation. The spinning funnel helps that the orientation of the molecules generated by the shear gradient in the extrusion die and by the stretch in the non-precipitating medium and accordingly the strength properties fixed by the precipitation are not deteriorated by an additional stretch of the precipitated cellulose thread. Furthermore, the use of the spinning funnel has the advantage that the feasibility of the process is substantially simplified, particularly at the beginning of spinning.

The solution of the cellulose is conveniently extruded at a temperature in the range from 70° to 115° C., preferably from 70° to 90° C., into the non-precipitating medium. It has been found that an improvement of the fiber properties is achieved, namely an increase of the elongation values and the strength, when the spinning temperature is lowered. The lower spinning temperatures result in a higher pre-orientation of the cellulose molecules in the die channel due to the increased viscosity of the spinning dope which leads to better textile physical properties of the fibers. The non-precipitating medium is generally gaseous. Particularly, it consists of air or nitrogen.

The temperature of the precipitating medium is conveniently maintained in the range from −2° to +20° C., preferably in the range from 5° to 10° C. It lies preferably below the precipitating bath temperature quoted in U.S. Pat. No. 4,246,221. The precipitating medium can consist of water or diluted aqueous solutions of the amine oxide used for dissolving the cellulose.

Preferably the cellulose solution is extruded through an extrusion die the cylindrical nozzle channels of which have a diameter in the range from 50 to 120 μm, especially in the range from 50 to 70 μm. The shear gradient necessary for orienting the molecules in the die channels is achieved by the die channel diameter which is reduced in comparison with the prior art. For manufacturing films the cellulose solution is conveniently extruded through an extrusion die the slots of which have a width in the range from 50 to 200 μm. It has been found that the physical values such as the loop elongation and the loop strength of film strips increase with a decreasing width of the slot.

The cellulose content of the solution to be extruded lies in the range from 6 to 16 weight percent, preferably in the range from 7 to 12 weight percent. In addition to the N-oxide, especially N-methylmorpholine-N-oxide, the solution contains about 10 to 14 weight percent, particularly about 12 weight percent water (solution in N-methylmorpholine-N-oxide monohydrate).

It was found that single threads spun from solutions in amine oxide by the dry wet extrusion process have a non-lobated round cross section. The different surface structure compared with the viscose fiber can be attributed to the different procedures with the fiber formation which with the viscose fiber comprise the coagulation and decomposition of the cellulose xanthogenate whereas a precipitation without chemical reaction takes place when the cellulose fiber is formed from a solution containing amine oxide as a solvent. The round cross section and the relatively smooth surface of cellulose fibers and filaments spun from aminoxide solution may cause problems with the further processing to yarns and flat-shaped articles. These problems can be an insufficient fiber adhesion when spinning the fibers to yarns, an insufficient thread connection of the filament yarns, and a too low non-slip property of the flat-shaped articles made from these fiber and filament yarns.

With a further embodiment of the process of the invention it is provided that profile fibers or filaments are spun in the extrusion die by profile nozzles having non-circular cross sections. Surprisingly it has been found that with the process of the invention a smoothing down of the profile of the solution jet given by the nozzle orifice is avoided, and the jet section given by the spinning capillary is substantially retained. By this the produced profile fiber gets favorable processing properties with respect to fiber adhesion with spinning, thread connection with filament yarns and non-slip-property of flat-shaped textile articles consisting of these yarns.

The consistency of the fiber cross section shaped by the nozzle capillary orifice with the jet ejection is based on the strong pre-orientation of the cellulosic chains in the capillary section and in the jet, the comparatively small external spinning stretch, the small distance between nozzle capillary exit and entry into the precipitating bath of preferably 0.2 to 2.0 cm, and the comparatively high viscosity of the spinning solution. The width of the non-cylindrical nozzle passage is characterized by its equivalent diameter of the formula $$d_{eq} = \sqrt{\frac{4F}{\pi}}$$

in which F is the cross-sectional area of the non-cylindrical passage. $d_{eq}$ is preferably in the range from 50 to 120 μm. The zero shear viscosity of the spinning dope at 95° C. generally lies in the range from 600 to 6000 Pa.s, preferably in the range from 1000 to 1250 Pa.s. Aside from the favorable properties of the textile products obtained from filaments spun according to the invention, such as fiber adhesion, non-slip property etc., an increased ultimate tensile strength is obtained compared with yarns of the same denier from filaments of same denier with a circular cross section. This results from the higher shear of the spinning solution in the profiled extrusion die bores and the elevated orientation of the cellulose molecules in the spinning jet and in the precipitated filament accompanied therewith.

According to the preferred embodiment of the process of the invention fibers or filaments having an Y, triangular or rectangular profile are spun from the solution through the profiled nozzles. For fibers having a rectangular profile the ratio of width to thickness of the cross section is in the range from 1:1 to 10:1, preferably in the range from 2:1 to 6:1. Nozzles with other cross sections different from the circular shape, e.g. square or star-shaped cross sections can be used. With Y-shaped nozzle cross sections the angle between the arms of the Y preferably amounts to 120° each. Furthermore, fibers having a hollow cross section can be spun, too.

According to a specific embodiment of the process of the invention the molecular mass of the cellulose used for the solution in step (a) has a bimodal distribution, and the weight ratio of the quantity of low-molecular cellulose to the quantity of high-molecular cellulose is in the range from 7:3 to 19:1. The differential mass distribution curve of the cellulose used for preparing the cellulosic solution and present in the solution shows two Gaussian-Distributions which are preferably non-overlapping or overlapping to a negligible extent. Such bimodally distributed cellulose improves the mechanical properties of the final products, especially the tenacity and elongation, and impedes the tendency of the cellulose to crystalize in the extruded products. Preferably the average degree of polymerization $\overline{P}$ of the low-molecular cellulose is in the range from 300 to 650 and the average degree of polymerization $\overline{P}$ of the high-molecular cellulose is in the range from 900 to 1800.

According to the process of the invention not only fibers and filaments can be produced but also films for versatile services. Thus film strips can be used as binder twine which can decay and decompose in a cow's stomach. Tubular films for use in the food packaging industry can be produced, too.

SPECIFIC DESCRIPTION OF THE DRAWINGS

Figure 1:
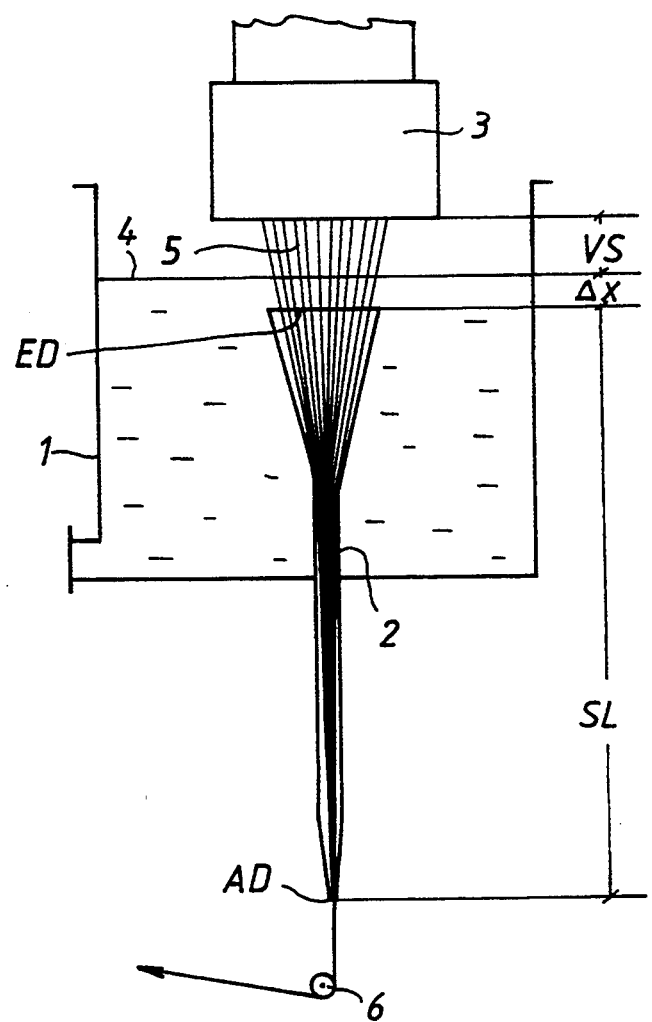
FIG. 1 schematically shows an apparatus for carrying out the process of the invention, and the dimensioning of the spinning funnel with regard to Table IV.

According to FIG. 1 a spinning funnel 2 is fixed in the precipitating bath container 1 so that its lower part extends downwards through the bottom of the container 1. The entry diameter and the exit diameter of the spinning funnel 2 are referred to as ED and AD, respectively. The length of the spinning funnel is referred to as SL. The distance of the bottom side of the spinneret 3 from the top side 4 of the spinning bath, i.e. the stretch interval, is referred to as VS, and the supernatant of the spinning bath above the top edge of the spinning funnel 2 is referred to as Δ x. The spun strand 5 of threads is accelerated by the spinning bath falling in the funnel 2 to such an extent that the supply velocity of the convergent strand of threads to the deflector element 6 is approximately equal to the draw-off velocity so that in practice no after-stretching occurs at the deflector element 6.

Figure 2:
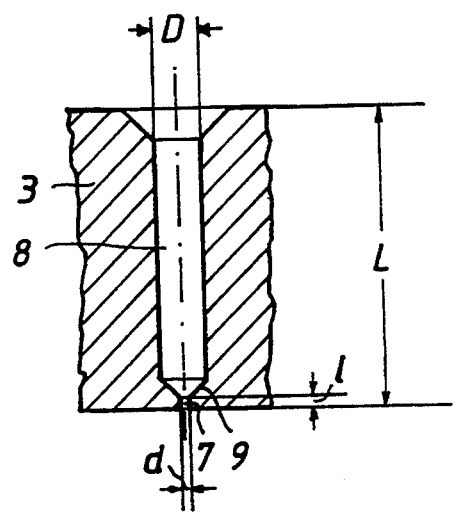
FIG. 2 shows a partial cross-section of a spinneret for the process of the invention showing the dimensioning of the nozzle passage.

FIG. 2 shows the longitudinal section of a spinneret passage having the typical shape as used with the process of the invention. The passage in the spinneret 3 comprises a capillary section 7 at the exit end and a prechannel section 8 which extends over longest portion of the spinneret plate 3. The shear forces are mainly effective in the capillary section 7 whereas they are negligible in the section 8. Both sections 7, 8 are connected to each other by a cone-shaped transition section 9. In practice the diameter D of the prechannel section is about three to ten times the diameter d of the capillary section. As the spinning pressure upstream of the nozzle is inversely proportional to the 4th power of the bore diameter, the spinning pressure is markedly reduced with the short length l of the capillary section 7.

SPECIFIC EXAMPLES

The process of the invention is herebelow illustrated by the examples. Some examples not covered by the invention are quoted for comparison.

EXAMPLES 1 to 3

A solution of wood cellulose in N-methylmorpholine-N-oxide/water (approximately monohydrate) having a cellulose content of 7.8 weight percent was prepared in a heated mixer and was fed from a storage tank via a geared pump to spinnerets having nozzle bores of the profile shown in FIG. 2. The diameters d of capillary section 7 were 50, 60 and 70 μm, respectively, and the ratio l/d was 1. The jets of the spinning dope ejected from the nozzles with a nozzle temperature of 95° C. pass an 11 mm broad air gap in which they are subjected to a spinning-stretch of 1.4, 2.1 and 2.8, respectively, before entering a diluted aqueous aminoxide solution as the spinning bath for precipitation the temperature of which is 7.5° C. The threads are drawn off with a take up velocity of 50 m/min through a spinning funnel supplied with the spinning bath liquid and having the dimensions SL=450 mm, ED=90 mm and AD=6 mm (cp. the Figure) the design of which with respect to length, flow profile and flow velocity controls the fiber properties. Then the threads are collected and subsequently cut to a staple fiber length of 34 to 38 mm.

COMPARATIVE EXAMPLES 1 and 2

The procedure was the same as in the examples 1 to 3 with the exception that the diameters of the nozzle bore were 80 μm and 90 μm, the spinning stretch was 3.4 and 4.7, and the shear gradients were $2.24 \times 10^4 \, s^{-1}$ and $1.58 \times 10^4 \, s^{-1}$, respectively.

Table I shows the dependence of the textile physical data of the fibers obtained according to the examples 1 to 3 and the comparative examples 1 and 2 on the shear gradient and the spinning stretch. It is obvious that the properties of the fibers with the same denier are affected by the shear gradient in the bore and the spinning stretch in such a way that despite the small spinning stretch the values for the elongation at break in dry and wet condition as well as the loop breaking strength are increased. As the elongation at break and the loop breaking strength are considered as a criterion for the brittleness of cellulosic fibers which affect the processibility and the performance characteristics, this is a way to control these properties favorably. Furthermore, it is evident from Table I that the dry and wet strength values have a high level despite of a spinning stretch of less than 3.

TABLE I

| | bore diameter d μm | bore density cm$^{-2}$ | shear gradient $10^4 \cdot s^{-1}$ | stretch | denier tex | fiber properties | | | | |
|---|---|---|---|---|---|---|---|---|---|---|
| | | | | | | elongation % | | strength mN/tex | | |
| | | | | | | dry | wet | dry | wet | loop |
| example 1 | 50 | 160 | 9,52 | 1,4 | 0,143 | 14 | 17 | 360 | 298 | 142 |
| example 2 | 60 | 160 | 5,29 | 2,1 | 0,145 | 13 | 16 | 372 | 305 | 139 |
| example 3 | 70 | 160 | 3,40 | 2,8 | 0,146 | 12 | 16 | 387 | 310 | 135 |
| comparative example 1 | 80 | 95 | 2,25 | 3,7 | 0,147 | 12 | 15 | 400 | 319 | 126 |
| comparative example 2 | 90 | 95 | 1,58 | 4,7 | 0,149 | 11 | 14 | 405 | 326 | 121 |

EXAMPLES 4 and 5

A solution of wood cellulose in N-methylmorpholine-N-oxide/water having a cellulose content of 10.5 weight percent is prepared in a heated mixer, and fibers are spun from the solution through spinning nozzles having a total passage length L of 500 μm, capillary diameters d of 50 μm and 60 μm, respectively, and an l/d of the capillary section of 1.2, in a procedure analogous to the Examples 1 and 2.

COMPARATIVE EXAMPLES 3 and 4

The procedure is the same as in the Example 4 with the exception that the spinning is carried out through nozzles having capillary diameters d of 70 μm and 90 μm.

The found fiber properties of the examples 4 and 5 and of the comparative examples 3 and 4 drawn up in Table II show that the values for the dry and wet elongation at break as well as for the loop strength at break increase even with a higher concentration of cellulose despite of a low spinning stretch, when the shear gradient in the nozzle bore is high, and that the level of the textile physical values is improved with increasing the concentration of the cellulose. This is based on the effect that the viscosity of the spinning dope increased by the higher cellulosic concentration results in a stronger orientation of the-cellulose molecules with comparable linear dope velocities in the nozzle bore. By this with a spinning stretch of 2.8 fibers can be produced which having a denier of 0.143 tex show strength data of 440 mN/tex and wet strength data of 370 mN/tex whereas according to U.S. Pat. No. 4,246,221 with a spinning stretch of 2.6 only strength data of 80 mN/tex and 71 mN/tex, respectively, are obtained (Example IVA).

EXAMPLES 6 to 12

A solution of wood cellulose in N-methylmorpholine-N-oxid/water having a cellulose content of 7.6 weight percent is prepared in a heated mixer, and fibers are produced therefrom in analogy to example 5. As can be seen from the Table III the spinning temperature adjusted by means of the nozzle temperature was varied between 70° and 115° C. The fiber properties were determined by tensile tests. It was found by them that better textile physical fiber properties were achieved with lower spinning temperatures because of the thereby increased viscosity of the spinning dope which leads to a stronger orientation of the cellulose molecules in the die channel.

TABLE III

| example No. | spinning temp. °C. | denier tex | fiber properties | | | | |
|---|---|---|---|---|---|---|---|
| | | | elongation % | | strength mN/tex | | |
| | | | dry | wet | dry | wet | loop |
| 6 | 70 | 0,156 | 12 | 13 | 483 | 407 | 149 |
| 7 | 75 | 0,150 | 11 | 13 | 480 | 403 | 146 |
| 8 | 80 | 0,153 | 11 | 12 | 478 | 395 | 139 |
| 9 | 85 | 0,155 | 10 | 12 | 472 | 385 | 129 |
| 10 | 90 | 0,154 | 10 | 12 | 462 | 367 | 120 |
| 11 | 95 | 0,153 | 10 | 12 | 448 | 343 | 112 |
| 12 | 115 | 0,156 | 9 | 11 | 316 | 222 | 80 |

EXAMPLES 13 to 16

To illustrate the use of differently dimensioned spinning funnels for the filament production a solution consisting of 6.10 weight percent cellulose (cuoxam dp 550), 93.88 weight percent N-methyl-morpholine-N-oxide monohydrate and 0.22 weight percent of a stabilizer is pressed at 85° C. through spinning nozzles having different numbers of capillaries (d = 120 μm and 100 μm, respectively; l=2 d) as quoted in Table IV. The strand of threads is stretched in the range from 2.2 to 2.7 in the air gap (10 mm) between the spinning nozzle exit and the coagulation bath entry, is axially engaged about 20 mm below the coagulation bath surface by a spinning glass funnel having the dimensions listed in Table IV (cp. FIG. 1), is drawn-off and conducted with a velocity of 50 m/min to a deflector element. The spinning funnel

TABLE II

| | bore diameter d μm | shear gradient $10^4 s^{-1}$ | stretch | denier tex | fiber properties | | | | |
|---|---|---|---|---|---|---|---|---|---|
| | | | | | elongation % | | strength mN/tex | | |
| | | | | | dry | wet | dry | wet | loop |
| example 4 | 50 | 7,02 | 1,9 | 0,141 | 15 | 18 | 434 | 360 | 175 |
| example 5 | 60 | 3,97 | 2,8 | 0,143 | 14 | 17 | 440 | 370 | 170 |
| comparative example 3 | 70 | 2,50 | 3,8 | 0,148 | 14 | 16 | 443 | 376 | 160 |
| comparative example 4 | 90 | 1,19 | 6,2 | 0,140 | 13 | 15 | 448 | 395 | 153 | is dimensioned so that the supply velocity through the funnel is equal to or a little bit smaller than the draw-off velocity of the subsequent washing unit for the NMMNO exchange. After washing the filament passes a finishing unit, is dried and taken up by a winding machine controlled by the tension of the thread. FIG. 1 shows the course of the thread during the spinning, the Table IV shows the parameters of the spinning funnel in dependence on the denier of the thread, the diameter of the capillary and the draw-off velocity.

larly the loop strength and the loop elongation which are significant for various applications of film strips also in fabricated conditions—increase with decreasing spinning stretch and increasing shear gradient.

TABLE V

|  | slot dimension length × width cm × cm | shear gradient $10^4 \, s^{-1}$ | stretch | denier tex | physical values of film strips | | | |
|---|---|---|---|---|---|---|---|---|
|  |  |  |  |  | elongation % | | strength cN/tex | |
|  |  |  |  |  | dry | loop | dry | loop |
| example 17 | 4 × 0,005 | 12,0 | 0,83 | 305 | 10,0 | 4,4 | 14,8 | 7,3 |
| example 18 | 4 × 0,010 | 3,0 | 1,66 | 300 | 9,4 | 3,8 | 15,5 | 6,9 |
| example 19 | 4 × 0,015 | 1,33 | 2,5 | 311 | 9,1 | 3,5 | 16,2 | 6,5 |
| comp. example 5 | 4 × 0,02 | 0,75 | 3,3 | 305 | 8,5 | 3,0 | 16,9 | 6,1 |
| comp. example 6 | 4 × 0,03 | 0,33 | 5,0 | 309 | 7,5 | 2,1 | 18,3 | 5,3 |

The term "stretch" means here the spinning stretch ratio which is the linear velocity of the precipitated molded article divided, by the linear velocity of the solution leaving the die.

EXAMPLES 20 to 26

TABLE IV

| example No. | diameter of capillary d µm | denier[1] tex | draw-off velocity m/min | spinning stretch | dimension of spinning funnel | | |
|---|---|---|---|---|---|---|---|
|  |  |  |  |  | SL mm | ED mm | AD mm |
| 13 | 120 | 12 (36) | 40 | 2,3 | 400 | 90 | 6 |
| 14 | 120 | 7,2 (24) | 50 | 2,6 | 450 | 75 | 4,7 |
| 15 | 120 | 7,2 (18) | 70 | 2,7 | 620 | 75 | 4,7 |
| 16 | 100 | 12 (48) | 50 | 2,2 | 450 | 90 | 6 |

[1]The numbers in brackets mean the number of single capillaries of one filament yarn.

EXAMPLES 17 to 19 AND COMPARATIVE EXAMPLES 5 AND COMPARATIVE 6

A solution of wood cellulose in N-methylmorpholine-N-oxid/water (monohydrate) having a cellulose content of 10.5 weight percent is prepared in a heated mixer and conducted from a storage tank via a geared pump to a slot spinneret having a slot length of 4 cm and capillary slot widths d of 0.03 cm, 0.02 cm, 0.015 cm, 0.010 cm and 0.005 cm, respectively, and ratios l/d of 0.5, 0.75, 1.0, 1.5 and 2.0, respectively, and to a slot passage length L of 650 µm. The film of the spinning dope emerging from the slot having a temperature of 70° C. passes a 12 mm broad air gap and arrives then in a diluted aqueous solution of the amine oxide as coagulation bath having a temperature of 5.5° C. The cellulose film precipitated in the coagulation bath is drawn off with a final draw-off velocity of 50 m/min, washed amine oxide free by passing through several washing bathes and dried. The thickness of the film amounts to about 12 µm.

The textile physical properties of the obtained film strips were determined. The data listed in Table V show that films with very good physical properties are obtained despite a spinning stretch of less than 3. Particu- A spinning dope consisting of 10.0 mass % cellulose (Cuoxam DP=520), 78.0 mass % N-methylmorpholine-N-oxide and 12.0 mass % water is extruded through spinning nozzles having different cross sections and different dimensions corresponding to the data in Table VI. The ratios $l/d_{eq}$ and $l/d$ were 1; the length L=400 µm.

The spinning jets emerging from the nozzles having a nozzle temperature of 95° C. pass an 11 mm broad air gap in which the stretch listed in Table VI is carried out. In these tests partly the shear velocity in the spinneret and partly the draw-off velocity was varied. Yarns of equal denier were prepared from the spun single filaments. The breaking strength of the yarns was determined. The found numerical data are listed in Table VI.

It appears from Table VI that going from the circular cross section over to the rectangular and Y-shaped (angle between the arms: 120°) cross section increases the shear velocity in the die channel by a factor up to 2 with equal denier and cross sectional area (cp. the examples 20, 21 and 23 as well as 25 and 26). The breaking strength of the yarn increases with it by the factor 1.45.

TABLE VI

| example no. | filament yarn tex | single filament tex | spinning stretch | spinning nozzle | | $d_{eq}$ µm | shear velocity m/min | draw-off velocity m/min | breaking strength cN/tex |
|---|---|---|---|---|---|---|---|---|---|
|  |  |  |  | cross section | dimensioning µm |  |  |  |  |
| 20 | 12 (36) | 0,33 | 2,3 | O | 100 = d |  | 23200 | 40 | 26,5 |
| 21 | 12 (36) | 0,33 | 2,3 | ▭ | 200 × 40 | 101 | 42700 | 40 | 37,2 |
| 22 | 12 (36) | 0,33 | 2,3 | ▭ | 200 × 40 | 101 | 65200 | 60 | 44,8 |
| 23 | 12 (36) | 0,33 | 2,3 | Y | 3 (80 × 35) | 103 | 46500 | 40 | 38,5 |
| 24 | 12 (36) | 0,33 | 2,9 | Y | 3 (80 × 30) | 96 | 63300 | 40 | 43,9 |

TABLE VI-continued

| example no. | filament yarn tex | single filament tex | spinning stretch | cross section | spinning nozzle dimensioning μm | $d_{eq}$ μm | shear velocity m/min | draw-off velocity m/min | breaking strength cN/tex |
|---|---|---|---|---|---|---|---|---|---|
| 25 | 12 (80) | 0,15 | 2,1 | O | 60 = d | | 38700 | 50 | 41,0 |
| 26 | 12 (80) | 0,15 | 2,1 | ▭ | 100 × 30 | 62 | 54700 | 50 | 49,4 |

A reduction of the cross sectional area allows to increase the shear velocity by a factor of approximately 1.4 with the same denier. The strength at beak of the filament yarn produced therefrom increases by approximately 14% ( cp. examples 23 and 24). Profiling the cellulose thread favors the mass transfer and the diffusion in the precipitating and washing steps. This allows to increase the draw-off velocity and by this with the same stretch to increase the radial velocity gradient by the factor 1.5 (examples 21 and 22). Consequently in all it can be settled that the increase of the shear velocity in the profiled die channel leads to a considerable increase of the breaking strength, and that the increase of the draw-off velocity positively affects the performance of the whole process.

EXAMPLES 27 AND 28

The adhesive lengths of the strips using fiber yarns of 40 tex prepared from the spinning fibers according to example 25 and 26 were measured following DIN 53834, part 1, "Simple tensile test with yarns and twists". They were 110 mN/ktex with the strip from the spinning fibers according to example 25 and 225 mN/ktex with the strip from fibers according to example 26.

EXAMPLES 29 AND 30 AND COMPARATIVE EXAMPLE 7

Flat fabrics with one warf and one filling (plain weave) were prepared from the filament yarns {2×12(36)tex} prepared according to the examples 20 and 23 and from a viscose filament yarn {2×12(40)tex} consisting of filaments spun through circular nozzles with the same thread counts of 22 threads/cm in warp and fill. The fabric samples were visually tested and rated for their non-slip property. It was apparent that the fabric from the filament yarn according to example 20 had a markedly lower non-slip property than the comparative fabric from viscose filament yarn, and the fabric from the filament yarn according to example 23 had an equal to slightly increased non-slip property compared with the comparative fabric from viscose filament yarn.

We claim:

1. A process for manufacturing molded articles of cellulose, which comprises the steps of:
    (a) providing an aqueous solution comprising cellulose in a tertiary amine N-oxide;
    (b) extruding jets of said aqueous solution through an extrusion die into a non-precipitating medium for cellulose, said extrusion die having nozzle passages the length L of which is in the range from 200 to 800 μm and the capillary section of which has a length l in the range from 50 to 240 μm and a ratio l/d of the length l to its diameter d in the range from 0.5 to 2.0, molecules of said cellulose in said jets of solution being preoriented by said extrusion die through a shear force gradient in said nozzle passages;
    (c) orienting further the cellulose molecules by stretching the extruded jets of solution in said non-precipitating medium with a spinning stretch ratio V of linear velocity of the precipitated molded article to the linear velocity of the solution leaving the die in the range 0.5<V<3; and
    (d) precipitating the molded cellulose articles from said jets of solution by contacting with a precipitating medium without stretching.

2. The process of claim 1 wherein the ratio l/d of the capillary section lies in the range from 0.8 to 1.5.

3. The process of claim 1 wherein the capillary section has a ratio l/d of 1 and a length of 50 to 70 μm.

4. The process of claim 1 wherein the capillary section has a ratio l/d of 2 and a length of 100 to 120 μm.

5. The process of claim 1 wherein the length L of the nozzle passages lies in the range from 400 to 600 μm.

6. The process of claim 1 wherein said spinning stretch ratio V lies in the range from 1.0 to <3.

7. The process of claim 1 wherein the step of precipitating the cellulose from said jets of solution is performed by contacting the jets concurrently with said precipitating medium in a spinning funnel.

8. The process of claim 7 wherein the stretching of the extruded jets is achieved by accelerating said article substantially to its draw-off velocity by said precipitating medium flowing through said spinning funnel.

9. The process of claim 1 wherein said aqueous solution is extruded through an extrusion die the nozzle passages of which have cylindrical capillary sections with diameters in the range from about 50 to 120 μm.

10. The process of claim 1 wherein said tertiary amine N-oxide is N-methylmorpholine-N-oxide.

11. The process of claim 1 wherein the molded article is a film and said aqueous solution is extruded through an extrusion die the slit orifice passages of which have a width in a range from about 50 to 200 μm.

12. The process of claim 1 wherein cellulose fibers or filaments are spun from said aqueous solution in an extrusion die by profiled spinnerets having capillary sections of non-circular cross-section.

13. The process of claim 12 wherein the non-circular cross-section of said capillary section has an equivalent diameter $d_{eq}$ in the range from about 50 to 120 μm.

14. The process of claim 12 wherein the fibers or filaments are spun from aqueous solutions having zero shear viscosity at 95° C. in a range of 600 to 6000 Pa.s.

15. The process of claim 1 wherein the jets of solution are extruded into a layer of non-precipitating medium having a thickness in a range from about 2 to 20 mm.

16. The process of claim 12 wherein said fibers or filaments are spun to provide a shape selected from the group consisting of Y, triangular and rectangular profiles.

17. The process of claim 1 wherein the molecular mass of the cellulose for the solution in step (a) has a bimodal distribution, and the weight ratio of the quantity of low-molecular cellulose to the quantity of high-molecular cellulose is in the range from 7:3 to 19:1.

18. The process of claim 17 wherein the average degree of polymerization P of the low-molecular cellulose is in a range from 300 to 650, and the average degree of polymerization P of the high-molecular cellulose is in a range from 900 to 1800.

19. A process for manufacturing fibers of cellulose, which comprises the steps of:
   (a) providing an aqueous solution comprising cellulose in a tertiary amine N-oxide;
   (b) extruding jets of said aqueous solution through an extrusion die into a non-precipitating medium for cellulose, said extrusion die having nozzle passages the length L of which is in the range from 200 to 800 $\mu$m and the capillary section of which has a diameter d in the range from 50 to 120 $\mu$m and a ratio l/d of its length to its diameter d in a range from 0.8 to 1.5, molecules of said cellulose in said jets of solution being preoriented by said extrusion die through a shear force gradient in said nozzle passages;
   (c) orienting further the cellulose molecules by stretching the extruded jets of solution in said non-precipitating medium with a spinning stretch ratio V of linear velocity of the precipitated molded fiber to the linear velocity of the solution leaving the die being in a range $1 < V < 3$; and
   (d) precipitating the molded cellulose fibers from said jets of solution by contacting with a precipitating medium without stretching.

20. A process for manufacturing films of cellulose, which comprises the steps of:
   (a) providing an aqueous solution comprising cellulose in a tertiary amine N-oxide;
   (b) extruding jets of said aqueous solution through an extrusion die into a non-precipitating medium for cellulose, said extrusion die having nozzle passages the length L of which is in a range from 350 to 650 $\mu$m and the capillary section of which has a width d in the range from 50 to 300 $\mu$m and a ratio l/d of its length to its width d in a range from 0.5 to 2, molecules of said cellulose in said jets of solution being preoriented by said extrusion die through a shear force gradient in said nozzle passages;
   (c) orienting further the cellulose molecules by stretching the extruded jets of solution in said non-precipitating medium with a spinning stretch ratio V of linear velocity of the precipitated molded film to the linear velocity of the solution leaving the die being in a range $1 < V < 3$; and
   (d) precipitating the molded cellulose films from said jets of solution by contacting with a precipitating medium without stretching.

* * * * *